(12) United States Patent
Lee (10) Patent No.: US 6,380,992 B1
(45) Date of Patent: Apr. 30, 2002

(54) LIQUID CRYSTAL DISPLAY DEVICE HAVING A DEFECTIVE PAD REPAIR STRUCTURE AND METHOD FOR MAKING THE SAME

(75) Inventor: Sung Soo Lee, Kyungsangbuk-Do (KR)

(73) Assignee: LG. Philips LCD Co., LTD, Seoul (KR)

( * ) Notice: Subject to any disclaimer, the term of this patent is extended or adjusted under 35 U.S.C. 154(b) by 0 days.

(21) Appl. No.: 09/276,446

(22) Filed: Mar. 25, 1999

(30) Foreign Application Priority Data

Apr. 28, 1998 (KR) .............................. 98-15083

(51) Int. Cl.[7] ............................................ G02F 1/1345
(52) U.S. Cl. ......................... 349/54; 349/152; 349/192
(58) Field of Search .......................... 349/54, 55, 149, 349/152, 192; 345/93; 257/734

(56) References Cited

U.S. PATENT DOCUMENTS

| 4,368,523 A | 1/1983 | Kawate |
| 4,422,731 A | 12/1983 | Droguet et al. |
| 4,549,200 A | 10/1985 | Ecker et al. |
| 4,630,355 A | 12/1986 | Johnson |
| 4,654,117 A | 3/1987 | Aoki et al. |
| 4,688,896 A | * 8/1987 | Castleberry ................. 349/55 |
| 4,689,116 A | 8/1987 | Coissard et al. |
| 5,532,853 A | * 7/1996 | Song et al. .................. 349/149 |
| 5,684,547 A | * 11/1997 | Park et al. .................... 349/54 |
| 5,731,855 A | * 3/1998 | Koyama et al. .............. 349/43 |
| 5,825,196 A | * 10/1998 | Irie et al. .................... 324/770 |
| 5,969,779 A | * 10/1999 | Kim et al. ................... 349/54 |
| 6,111,558 A | * 8/2000 | Jeung et al. .................. 345/93 |
| 6,128,050 A | * 10/2000 | Sekiguchi .................... 349/40 |

FOREIGN PATENT DOCUMENTS

| JP | 4-127127 | * 4/1992 |
| JP | 5-232496 | * 9/1993 |
| JP | 9-224048 | * 9/1997 |
| JP | 5-2324496 | * 6/1998 |

* cited by examiner

*Primary Examiner*—Kenneth Parker
(74) *Attorney, Agent, or Firm*—Long Aldridge & Norman LLP

(57) ABSTRACT

A method for forming a defective pad repair structure in a liquid crystal display device having a plurality of pads disposed on a substrate. At least one defective pad repair line is provided to oppose the pads with an insulating layer disposed between the pads and the defective pad repair line. When at least one of the pads is broken, the broken pad can be restored by connecting the broken pad to the repair line by a welding process.

36 Claims, 6 Drawing Sheets

FIG. 10

LIQUID CRYSTAL DISPLAY DEVICE HAVING A DEFECTIVE PAD REPAIR STRUCTURE AND METHOD FOR MAKING THE SAME

CROSS-REFERENCE TO RELATED ART

This application claims priority of Korean Patent application No. 98-15083 filed on Apr. 28, 1998, the disclosure of which is incorporated herein by reference.

BACKGROUND OF THE INVENTION

1) Field of the Invention

The present invention relates to a liquid crystal display (LCD) device, and more particularly, to a thin-film transistor (TFT) LCD device designed such that defects in a pad portion can be easily repaired.

The present invention further relates to a method for repairing the defects in the pad portion.

2) Description of Related Art

Generally, a TFT LCD device typically includes a pair of substrates that are maintained in a spaced apart, yet parallel, relationship with one another. The space between the substrates is commonly referred to as the cell gap. Interposed between the substrates, within in the cell gap, is a liquid crystal material that changes its optical characteristics in response to an applied electrical signal.

On one of the substrates, a matrix of pixel electrodes are provided. The pixel electrodes are comprised of gate lines and data lines, the data lines being disposed vertically to the gate lines.

The TFT is provided on a side of the pixel electrodes to switch signals applied to each pixel electrode. In addition, source electrodes and gate electrodes of the TFT are connected to the data lines and the gate lines, respectively.

When one of the gate and data lines is broken, the signal is not fed to the broken line. The broken line causes deterioration in the quality of displayed images. Therefore, the broken line should be repaired. U.S. Pat. No. 4,807,973 to Kawasaki et al. discloses a matrix address display apparatus having a repair line for restoring the broken line. This patent will be described hereinafter with reference to FIGS. 1a and 1b.

Figure 1A:
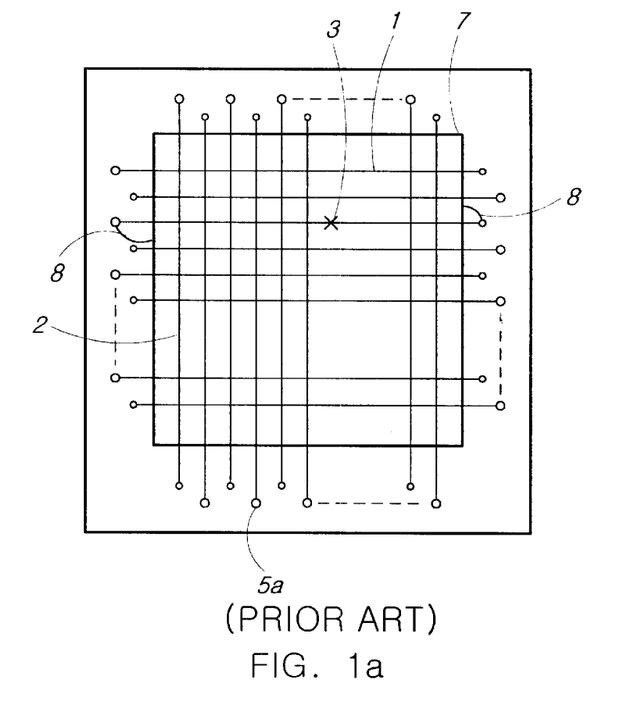
FIGS. 1a and 1b are plan views illustrating a repair line structure of a conventional liquid crystal device.

Referring first to FIG. 1, the apparatus comprises gate lines 1 and data lines 2, the data lines being disposed vertically (i,e.,perpendiculary) to gate lines 1. A plurality of display cells are formed on cross points of the gate lines 1 and the data lines 2, thereby making a pixel part. A closed repair line 7 is provided around the pixel part.

If one of the gate or data lines 1 or 2 is broken at a point 3, the repair line 7 is connected to both ends of the broken line by a conductive material 8. As a result, since the broken line is restored by the repair line 7 disposed around the pixel part, the signal can be fed to the broken line through the repair line 7.

Figure 1B:
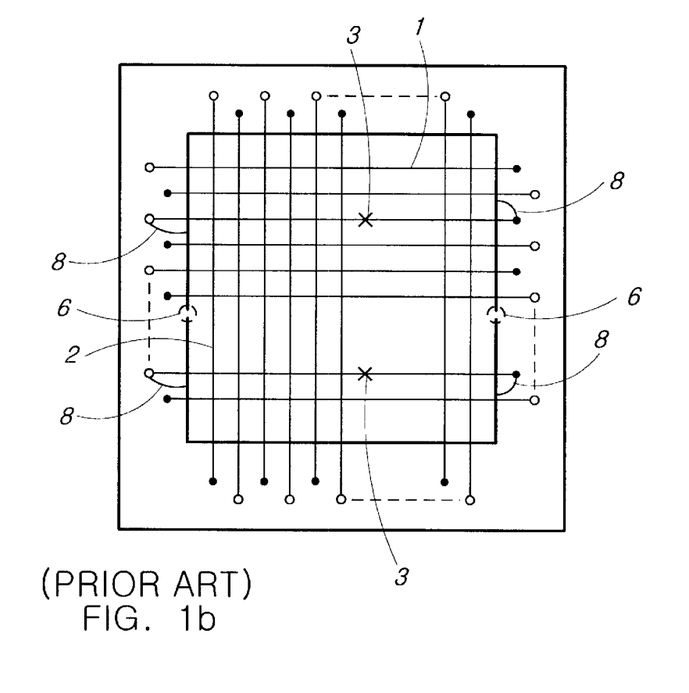

FIG. 2 shows another embodiment of the patent. In this embodiment, two disconnection parts 6 are provided for dividing the repair line into two repair lines 7a and 7b. As a result of dividing the repair line, two lines broken at each of the broken points 3 can be respectively connected to the repair lines 7a and 7b by the conductive material. As a result, since both of the broken lines are restored by the repair lines 7a and 7b, respectively, the signal can be transmitted to the broken lines through the repair lines 7a and 7b.

In the above described repair line structure of the liquid crystal display device, when the gate or data line is broken, this can be restored by the repair line. However, if a gate pad portion or a data pad portion is broken or defective, since the repair line structure is designed not to repair the broken pad portion, a pixel corresponding to the defective pad portion can not be excited.

SUMMARY OF THE INVENTION

Therefore, it is a first object of the present invention to provide a liquid crystal display device having a defective pad repair structure that can easily repair a defective pad.

It is a second object of the present invention to provide a method for making a defective pad repair structure.

To achieve the first object, the present invention provides a display device comprising a plurality of pads for inputting signals from a drive circuit to a plurality of drive lines, and means for, when at least one of contact the pads is defective, repairing the defective pad. The means comprises at least one pad repair line disposed to oppose ie., overlap the pads, and an insulating layer disposed between the at least one repair line and the pads.

Preferably, the pads are divided into a plurality of groups and the at least one pad repair line is provided for each group.

The pad repair line may be of a close-type crossing both ends of each of the pads.

The pad repair line may be of an open-type crossing both ends of each of the pads.

To achieve the second object, the present invention provides a method for forming a defective pad repair structure in a liquid crystal display device having a plurality of pads disposed on a substrate, the method comprising the step of forming at least one defective pad repair line to oppose the pads with an insulating layer disposed between the pads and the defective pad repair line, whereby when at least one of the pads is broken, the broken pad can be restored by connecting the broken pad to the repair line by a welding process.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Reference will now be made in detail to the present preferred embodiment of the invention, an example of which is illustrated in the accompanying drawings. Wherever possible, the same reference numbers will be used throughout the drawings to refer to the same or like parts.

Figure 2:
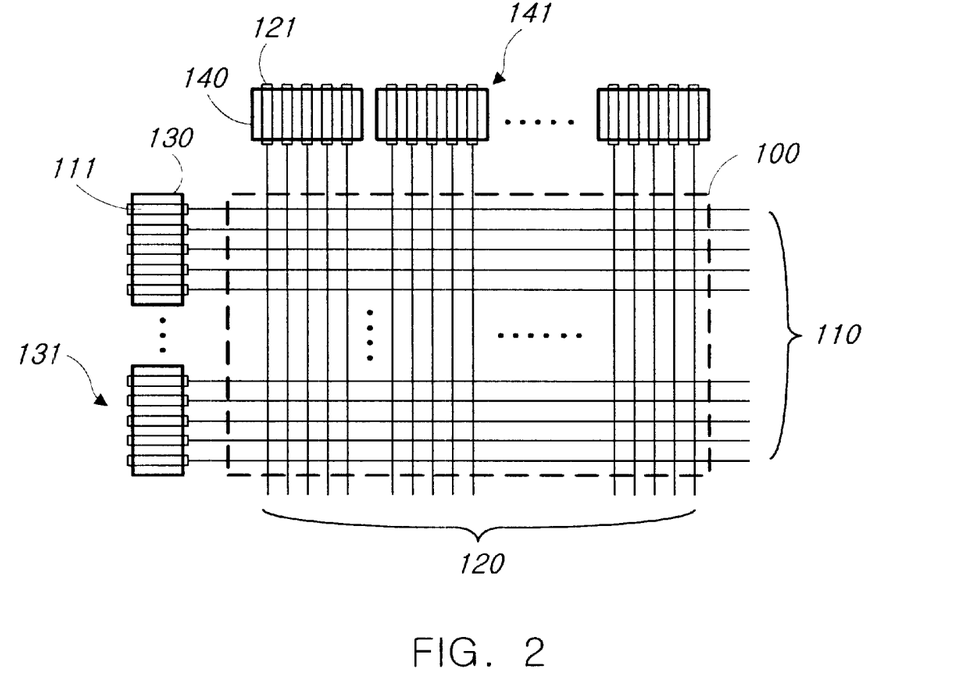
FIG. 2 is a plan view illustrating a liquid crystal display device having a defective pad repair structure according to a first embodiment of the present invention.
Figure 3:
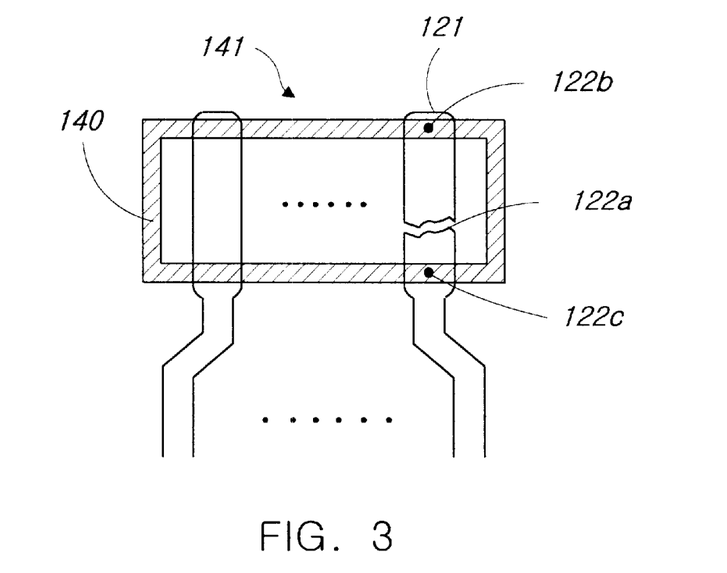
FIG. 3 is an enlarged view of a group of pads having a defective pad and a pad repair structure depicted in FIG. 2.

FIG. 2 shows a liquid crystal display device having a defective pad repair structure according to a first embodiment of the present invention, and FIG. 3 shows a group of pads having a defective pad and a pad repair structure depicted in FIG. 2.

The liquid crystal display device includes a plurality of gate lines 110, and a plurality of data lines 120 vertically disposed to the gate lines 110. The gate lines 110 and data lines 120 are respectively connected to gate pads 111 and data pads 121 to receive signals from a drive circuit (not shown).

The gate pads 111 are divided into a plurality of groups 131, and a close-type defective gate pad repair line 130 is provided around each of the gate pad groups 131. The gate pad repair line 130 is insulated from and disposed above opposite ends of each of the gate pads 111. The data pads 121 are also divided into a plurality of groups 141, and a close-type defective data pad repair line 140 is provided around each of the data pad groups 141. The data pad repair line 140 is also insulated from and disposed above opposite ends of each of the data pads 121.

Figure 4A:
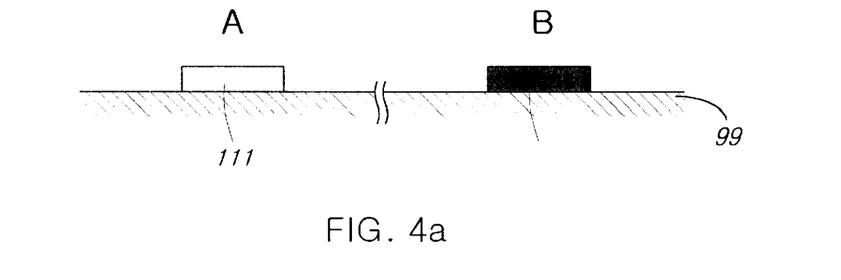
FIGS. 4a through 4d are sectional views illustrating a process for forming a defective pad repair structure according to a preferred embodiment of the present invention.
Figure 4B:
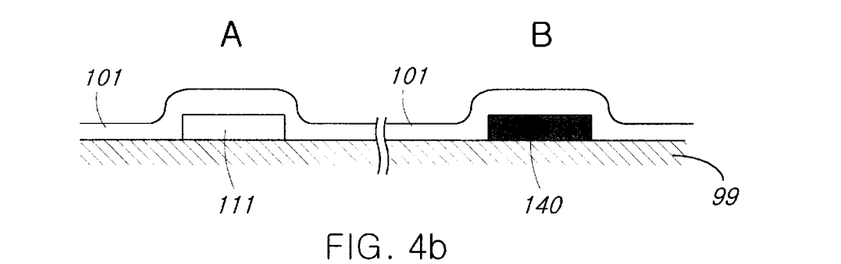

FIGS. 4a through 4b illustrates, in sectional views, a process for forming a defective pad repair structure according to a preferred embodiment of the present invention.

First, as shown in FIG. 4a, the groups 131 of the gate pads 111 and the defective data pad repair lines 140 are formed on a substrate 99. An insulating layer 101 is applied on the substrate 99 to cover the gate pads 111 and the defective data pad repair lines 140 as shown in FIG. 4b. Preferably, the gate pads 111 and the defective data pad repair lines 140 are made of the same material.

Figure 4C:
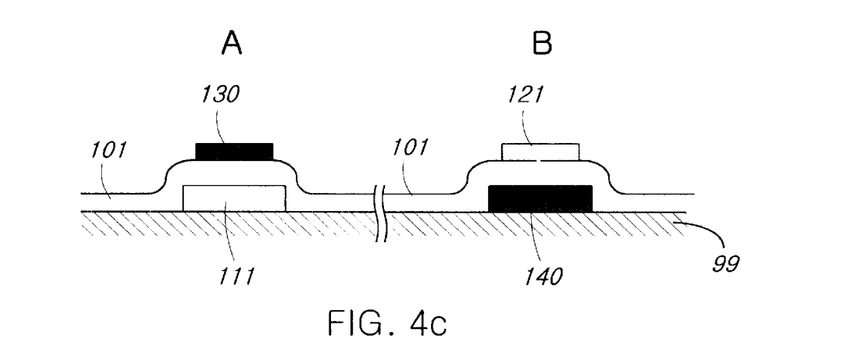

As shown in FIG. 4c, the defective gate pad repair lines 130 are formed on the insulating layer 101 to respectively correspond to the groups 131 of the gate pads 111, and, simultaneously, the groups 141 of data pads 121 are also formed on the insulating layer 101 to respectively correspond to the defective data pad repair lines 140.

In the above described liquid crystal display device, as shown in FIG. 3, when one of the pads 111 and 121 is broken at a portion 122a, the data line connected to the broken data pad 121 cannot be applied with a signal.

Figure 4D:
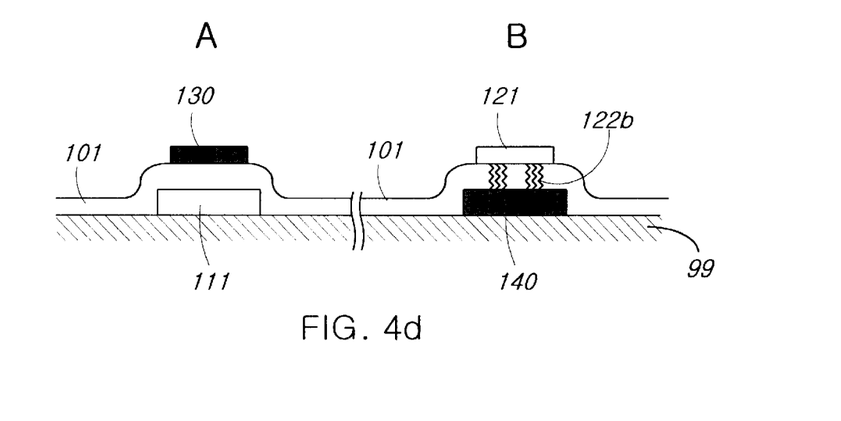

To restore the broken data pad 121, as shown in FIG. 4d, both ends of the broken data pad 121 are connected to the corresponding defective data pad repair line 140 by, for example, laser welding.

That is, portions of the insulating layer 101 between both ends of the broken data pad 121 and the corresponding defective data pad repair line 140 are removed by the laser. Both ends of the broken data pad 121 are connected to the corresponding data pad repair line 140 by a conductive material through the removed portions.

As a result, pixel drive data from the drive circuit can be induced into the data pad repair line 140 through welding portions 122b and 122c and consequently into the corresponding data line 120. That is, even if a pad is broken, the pixels corresponding to the broken pad can be excited by the pad repair line.

Reference numeral 100 in FIG. 2 indicates a repair line for rescuing one of the gate and data lines 110 and 120 in the case the same is defective.

Figure 5:
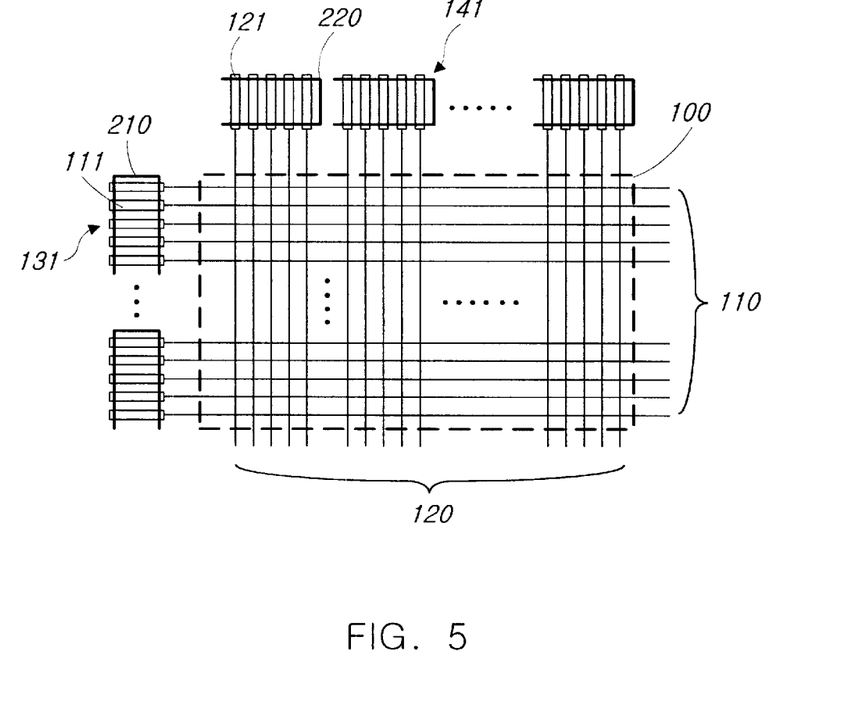
FIG. 5 is a plan view illustrating a liquid crystal display device having a defective pad repair structure according to a second embodiment of the present invention.

FIG. 5 shows a liquid crystal display device having a defective pad repair structure according to a second embodiment of the present invention.

The liquid crystal display device includes a plurality of gate lines 110, and a plurality of data lines 120 vertically disposed to the gate lines 110. The gate lines 110 and data lines 120 are respectively connected to gate pads 111 and data pads 121 to receive signals from a drive circuit (not shown).

The gate pads 111 are divided into a plurality of groups 131, and a defective gate pad repair line 210 is provided around each of the gate pad groups 131. Each of the gate pad repair lines 210 is insulated from and disposed to cross opposite ends of each of the gate pads 111. However, in this embodiment, each of the gate pad repair lines 210 is opened at a portion located outside a gate pad arranged on one end of each of the gate pad groups 131.

The data pads 121 are also divided into a plurality of groups 141, and a defective data pad repair line 220 is provided around each of the data pad groups 141. The data pad repair lines 220 are insulated from and disposed to cross opposite ends of each of the data pads 121. Each of the data pad repair lines 220 is also opened at a portion located outside a gate pad arranged on one end of each of the data pad groups 141.

Figure 6:
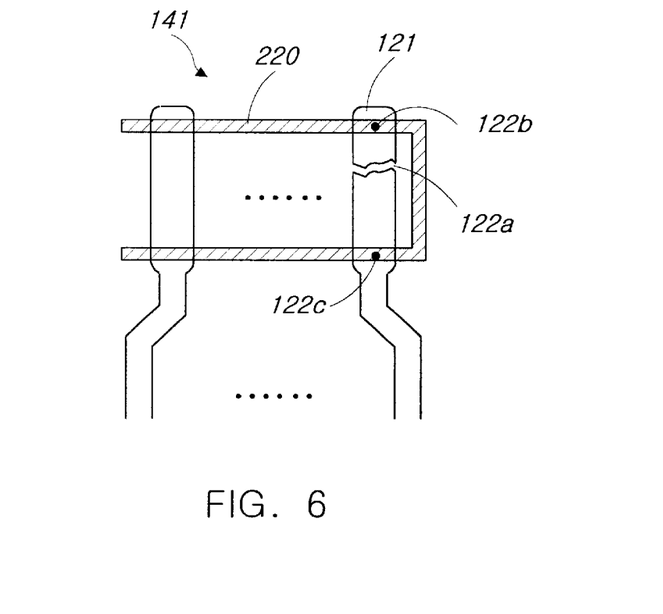
FIG. 6 is an enlarged view of a group of pads having a defective pad and a pad repair structure depicted in FIG. 5.

In the liquid crystal display device according to this embodiment, if a pad 121 is broken at a portion 122a as shown in FIG. 6, both ends of the broken data pad 121 are connected to the corresponding defective data pad repair line 220 in the same way as described in the first embodiment.

Figure 7:
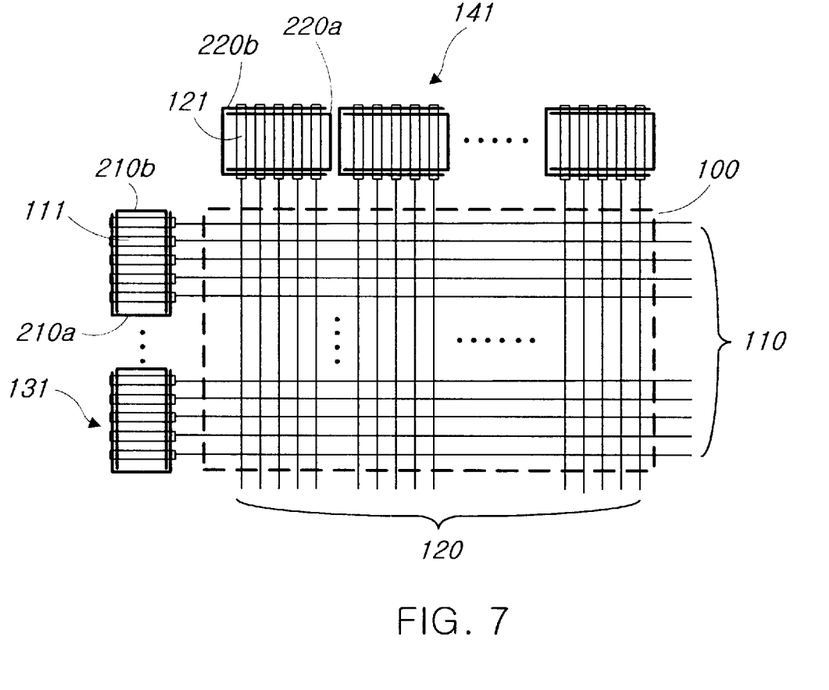
FIG. 7 is a plan view illustrating a liquid crystal display device having a defective pad repair structure according to a third embodiment of the present invention.

FIG. 7 shows a liquid crystal display device having a defective pad repair structure according to a third embodiment of the present invention.

In this embodiment, each group 131 of the gate pads 111 is provided with two defective gate pad repair lines 210a and 210b. The defective gate pad repair lines 210a and 210b are respectively opened at portions located outside gate pads arranged both ends of each of the gate pad groups 131.

Each group 141 of the data pads 121 is also provided with two defective data pad repair lines 220a and 220b. The defective data pad repair line 220a is opened at a portion located outside a gate pad arranged on one end of the each of the data pad groups 141. The defective data pad repair line 220b is opened at a portion located outside a data pad arranged on the other end of the data pad group 141.

Each of the gate and data pad repair lines 210a, 210b, 220a and 220b is also insulated from and disposed to cross opposite ends of each of the gate and data pads 111 and 121.

Since the process for making the pad repair structure is the same as that of the first embodiment, the description thereof will be omitted herein.

Figure 8:
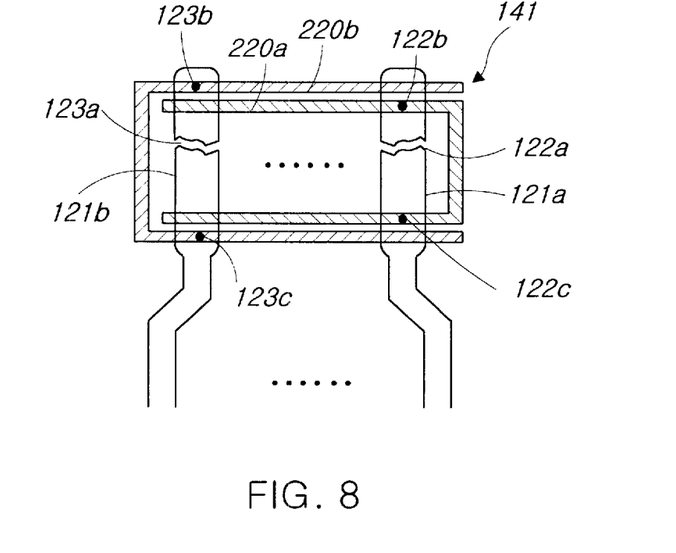
FIG. 8 is an enlarged view of a group of pads having a defective pad and a pad repair structure depicted in FIG. 8.

In the liquid crystal display device according to this embodiment, as shown in FIG. 8, if two of the data pads 121 in one of the pad groups 141 are broken at portions 122a and 123a, respectively, the broken data pads 121a and 121b are connected to the defective data pad repair lines 220a and 220b, respectively, at their respective cross points 123b, 123c and 122b and 122c through a welding process as in the first embodiment.

As described above, since the broken data pads 121a and 121b are respectively restored by the defective data pad repair lines 220a and 220b, the signals induced from the drive circuit can be transmitted to the corresponding data lines through the defective data pad repair lines 220a and 220b.

Figure 9:
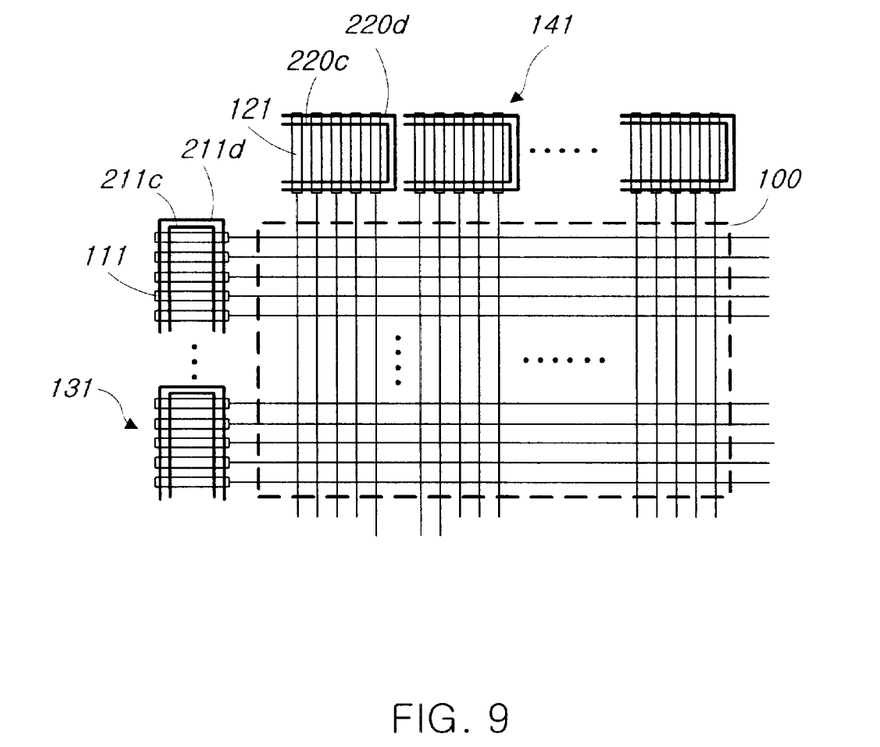
FIG. 9 is a plan view illustrating a liquid crystal display device having a defective pad repair structure according to a fourth embodiment of the present invention.

FIG. 9 shows a liquid crystal display device having a defective pad repair structure according to a fourth embodiment of the present invention.

In this embodiment, as in the third embodiment, each group 131 of the gate pads 111 is provided with two defective gate pad repair lines 211c and 211d. However, both of the defective gate pad repair lines 211c and 211d are opened at portions located outside a gate pad arranged on one end of each of the gate pad groups 131.

Each group 141 of the data pads 121 is also provided with two defective data pad repair lines 220c and 220d that are also opened at portions located outside a gate pad arranged on one end of the each of the data pad groups 141.

Each of the gate and data pad repair lines 211c, 211d, 220c and 220d is also insulated from and disposed to cross opposite ends of each of the gate and data pads 111 and 121.

Since the process for making the pad repair structure of this embodiment is the same as that of the first embodiment, the description thereof will be omitted herein.

Figure 10:
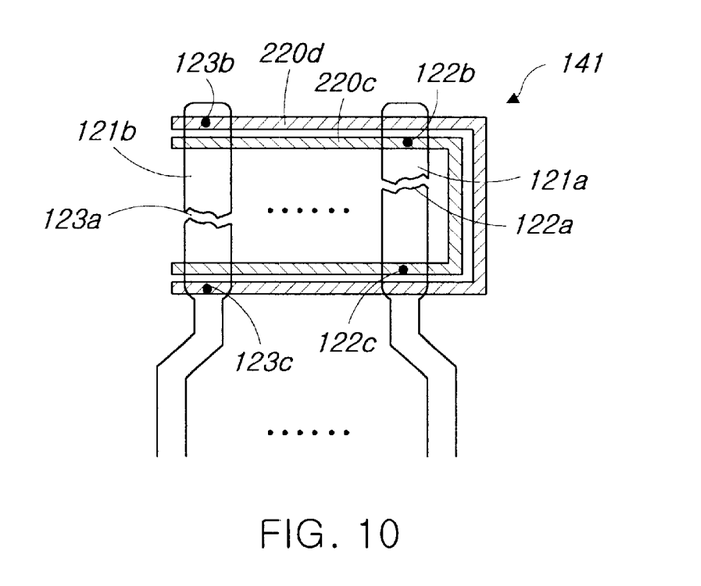
FIG. 10 is an enlarged view of a group of pads having a defective pad and a pad repair structure depicted in FIG. 9.

In the liquid crystal display device according to this embodiment, as shown in FIG. 10, if two of the data pads 121 in one of the pad groups 141 are broken at portions 122a and 123a, respectively, the broken data pads 121 are connected to the defective data pad repair lines 220c and 220d, respectively, at their respective cross points 123b, 123c and 122band 122c through a welding process as in the first embodiment.

As described above, since the broken data pads 121a and 121b are respectively restored by the defective data pad repair lines 220c and 220d, the signals induced from the drive circuit can be transmitted to the corresponding data lines through the defective data pad repair lines 220c and 220d.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

For example, in the above embodiments, although one or two repair lines are provided to each group, more repair lines can be provided as far as the repair lines are not electrically connected to each other.

In addition, the pad repair structure of this invention can be applied to any of the semiconductor device having such pads for transmitting signals to signal switching lines.

What is claimed is:

1. A method for forming a defective pad repair structure in a liquid crystal display device having a plurality of pads disposed on a substrate, said method comprising the step of forming at least one defective pad repair line crossing two end portions of the pads with an insulating layer disposed between said pads and the defective pad repair line, whereby when at least one of said pads is broken, the broken pad can be restored by connecting said broken pad to a defective pad repair line.

2. The method of claim 1 wherein said pads are divided in a plurality of groups and said at least one defective pad repair line is provided to each group.

3. The method of claim 2 wherein said defective pad repair line is a close-type line crossing both ends of each of the pads.

4. The method of claim 2 wherein said defective pad repair line is an open-type line crossing both ends of each of the pads.

5. The method of claim 1 wherein said defective pad repair line is made of the same material as that of the pad.

6. A method for making a liquid crystal display device, comprising the steps of:

forming a plurality of first pads and at least one first defective pad repair line on a substrate, wherein said at least one first defective pad repair line crosses two end portions of the first pads;

applying an insulating layer on the substrate to cover said first pads and said at least one first defective pad repair line; and forming a plurality of second pads and at least one second defective pad repair line on the insulating layer to correspond to said at least one first defective pad repair line and said first pads, respectively.

7. The method of claim 6 wherein said first pads are divided into a plurality of first groups and said at least one second defective pad repair line is provided to each first group.

8. The method of claim 6 wherein said second pads are divided into a plurality of second groups and said at least one first defective pad repair line is provided to each second group.

9. The method of claim 6 wherein each of said first and second defective repair lines is a close-type line crossing both ends of each of the first and second pads.

10. The method of claim 6 wherein each of said first and second repair line is an open-type line crossing both ends of each of the first and second pads.

11. The method of claim 6 wherein said at least first defective pad repair line is made of the same material as that of the second pad.

12. The method of claim 6 wherein said at least second defective pad repair line is made of the same material as that of the first pad.

13. A thin-film transistor liquid crystal display device comprising:

a plurality of pads for inputting signals from a drive circuit to a plurality of drive lines; and a repair structure for, when at least one of said pads is defective, repairing said defective pad, said repair structure including at least one defective pad repair line that crosses both end portions of the plurality of pads, and wherein an insulating layer is disposed between said at least one defective pad repair line and the pads.

14. The display device of claim 13, wherein said plurality of pads are divided into a plurality of groups and at least one defective pad repair line is provided to each group.

15. The display device of claim 14 wherein said at least one defective pad repair line is of a close-type that crosses both ends of each of said pads of a group of pads.

16. The display device of claim 14, wherein said at least one defective pad repair line is of an open-type that crosses both ends of each of said pads of a group of pads.

17. The display device of claim 14 wherein, when more than two pad repair lines are provided, said pad repair lines are electronically insulated from each other.

18. A signal switching device comprising:

a plurality of first signal switch lines;

a plurality of second signal switch lines disposed perpendicularly to the first signal switch lines;

a plurality of first pads connected to said first signal switch liens to transmit signals thereto;

a plurality of second pads connected to said second signal switch lines to transmit signals thereto; and a repair structure for, when at least one of said first and second pads is defective, repairing said defective pad, said repair structure including at least one defective pad repair line that crosses both end portions of the plurality of first pads and end portions of the plurality of second pads, and wherein an insulating layer is disposed between said at least one defective pad repair line and the plurality of first pads and the plurality of second pads.

19. The display device of claim 18 wherein said first and second pads are divided into a plurality of groups and said at least one pad repair line is provided to each group.

20. In a thin-film transistor liquid crystal display device having a plurality of contact pads disposed on a substrate each having two end portions, a method for repairing defective pads comprising:

forming a defective pad repair line on the substrate from a conductive material, the repair line having a spaced apart relationship with the pads and crossing the two end portions of each pad;

electrically insulating the repair from the pads; and for a defective pad, electrically connecting each of the end portions thereof to the repair line.

21. The method of claim 20, wherein the repair line is electrically insulated from the pads by an insulating layer formed on the substrate between the repair line and the pads, and wherein the defective pad is electrically connected to the repair line by forming an electrical connection through a portion of the insulating layer between each end portion of the defective pad and the corresponding portion of the repair line that crosses the end portion of the defective pad.

22. The method of claim 21, wherein the electrical connections through the portions of the insulating layer are formed by laser welding.

23. In a thin-film transistor liquid crystal display device having a plurality of contact pads disposed on a substrate each having two end portions, a defective pad repair line formed on the substrate from a conductive material, the repair line having a spaced apart relationship with the pads and crossing the two end portions of each pad, and an insulating layer formed on the substrate between the pads and the repair line, a method for repairing defective pads comprising:

determining which if any of the pads are defective; and electrically connecting each of the end portions of a defective pad to the repair line.

24. The method of claim 23, wherein the defective pad is electrically connected to the repair line by forming an electrical connection through a portion of the insulating layer between each end portion of the defective pad and the corresponding portion of the repair line that crosses the end portion of the defective pad.

25. The method of claim 24, wherein the electrical connections through the portions of the insulating layer are formed by laser welding.

26. A semiconductor device having a substrate and a plurality of signal lines formed on the substrate, each signal line connected to a contact pad formed on the substrate for receiving signals, each pad having two opposite end portions, the improvement which comprises:

a first defective pad repair line formed on the substrate from a conductive material, the repair line having a spaced apart relationship with the pads and crossing the two opposite end portions of each of the pads, the repair line being electrically insulated from either all or all but one of the pads.

27. The semiconductor device of claim 26, wherein the repair line is insulated from the pads by an insulating layer formed on the substrate between the repair line and the pads.

28. The semiconductor device of claim 26, wherein at least one of the pads is defective, and wherein the repair line is electrically connected to both end portions of the defective pad.

29. The semiconductor device of claim 28 further comprising an insulating layer formed on the substrate between the repair line and the contact pads, wherein a portion of the insulating layer between each end portion of the defective pad and the corresponding portion of the repair line that crosses the end portion of the defective pad is removed to form an electrical connection between the repair line and each end portion of the defective pad.

30. The method of claim 29, wherein the electrical connections between the repair line and the end portions of the defective pad are formed by laser welding.

31. The semiconductor device of claim 26, wherein a plurality of groups of contact pads are formed on the substrate, and the device further comprises one repair line provided for each group of pads.

32. The semiconductor device of claim 26, wherein the repair line forms a close-type line.

33. The semiconductor device of claim 26, wherein the repair line forms an open-type line.

34. The semiconductor device of claim 26, wherein the repair line and the contact pads are formed from the same material.

35. The semiconductor device of claim 26, further comprising a second defective pad repair line formed on the substrate from a conductive material, the second repair line having a spaced apart relationship with the pads and crossing the two opposite end portions of each of the pads, the second repair line being electrically insulated from either all or all but one of the pads and electrically insulated from the first repair line.

36. The semiconductor device of claim 26, wherein the device is a thin-film transistor liquid crystal display device and the signal lines are gate lines and data lines of the liquid crystal display device.

* * * * *